United States Patent
Ohresser et al.

(10) Patent No.: US 8,231,918 B2
(45) Date of Patent: *Jul. 31, 2012

(54) METHOD FOR DELIVERING FASTER A SHORT COFFEE EXTRACT FROM CAPSULE

(75) Inventors: Sylvia Ohresser, Nürnberg (DE); Paul Eichler, Arnex-sur-Orbe (CH); Peter Koch, Orbe (CH); Ernest Raetz, Lignerolle (CH)

(73) Assignee: Nestec S.A., Vevey (CH)

( * ) Notice: Subject to any disclaimer, the term of this patent is extended or adjusted under 35 U.S.C. 154(b) by 436 days.

This patent is subject to a terminal disclaimer.

(21) Appl. No.: 12/374,825

(22) PCT Filed: Jul. 11, 2007

(86) PCT No.: PCT/EP2007/057072
§ 371 (c)(1),
(2), (4) Date: Jan. 23, 2009

(87) PCT Pub. No.: WO2008/012203
PCT Pub. Date: Jan. 31, 2008

(65) Prior Publication Data
US 2009/0324791 A1     Dec. 31, 2009

(30) Foreign Application Priority Data
Jul. 24, 2006   (EP) ................................. 06015331

(51) Int. Cl.
A23F 5/24   (2006.01)
(52) U.S. Cl. ........................... 426/433; 426/594
(58) Field of Classification Search ............ 426/433, 426/594
See application file for complete search history.

(56) References Cited

U.S. PATENT DOCUMENTS

| 3,149,977 | A | * | 9/1964 | Baldwin et al. | 426/240 |
| 5,082,676 | A |   | 1/1992 | Love et al.    | 426/79  |
| 5,897,899 | A | * | 4/1999 | Fond           | 426/112 |

FOREIGN PATENT DOCUMENTS

| EP | 0 554 650 A1 | 8/1993 |
| EP | 844 195 A1   | 5/1998 |
| EP | 844 195 B1   | 5/1998 |

(Continued)

OTHER PUBLICATIONS

International Search Report PCT/EP2007/057072 Dated Sep. 3, 2007.

(Continued)

*Primary Examiner* — Anthony Weier
(74) *Attorney, Agent, or Firm* — Winston & Strawn LLP (57) ABSTRACT

A method for delivering a short coffee extract faster from a closed capsule containing ground coffee by injecting water under pressure within the capsule. The capsule is filled with ground coffee, has a delivery membrane and is extracted in a coffee extraction device and pressurized water is injected in the capsule under pressure. The coffee beverage is released through the beverage delivery membrane of the capsule with engaging means engaging in and/or against the membrane. The pressure loss is reduced in the coffee bed by providing ground coffee having a reduced percentage of fines (F) depending on the average particle size (D4,3). The extraction yield is maintained between 15 and 30% and the coffee extract of 25 or 40 grams is delivered in a flow time of 20 seconds or less.

20 Claims, 8 Drawing Sheets

FOREIGN PATENT DOCUMENTS

| | | |
|---|---|---|
| EP | 1 566 127 A2 | 8/2005 |
| EP | 1 566 127 A3 | 8/2005 |
| EP | 1 566 127 B1 | 8/2005 |
| EP | 1 882 432 B1 | 1/2008 |

OTHER PUBLICATIONS

Notice of Opposition to European Patent No. 1 882 432 (Apr. 14, 2011).

Opposition of European Patent No. EP 1 882 432 by Martin MacLean (Apr. 14, 2011).

Reply to the Notice of Opposition by Brian Cronin, with attachments (Dec. 21, 2011).

Ephraim, "Coffee Grinding and its Impact on Brewed Coffee Quality," Tea & Coffee Trade Journal, pp. 28-38 (Nov. 2003).

Ephraim, "Roller mills: Precisely reducing particle size with greater efficiency," Powder and Bulk Engineering, 4 pages (Jun. 2006).

Illy et al., Espresso Coffee, The Science of Quality, Second Edition, Elsevier Academic Press, pp. 16-19, 214-227, 259-270, 274-277, and 282-285 (2005).

\* cited by examiner

METHOD FOR DELIVERING FASTER A SHORT COFFEE EXTRACT FROM CAPSULE

This application is a 371 filing of International Patent Application PCT/EP2007/057072 filed Jul. 11, 2007.

BACKGROUND ART

The present invention relates to a method for delivering coffee beverages from capsules designed to be extracted under pressure and containing a substance for the preparation of a coffee beverage.

Coffee cups can be produced from filter coffee machines. However, as a result of a "light" extraction of the coffee, the resulting extract usually has low coffee solids concentration, a low aroma profile, and little or no "crema" on the top.

Capsules designed to be extracted under pressure and containing a substance for the preparation of a beverage exist on the market. They provide a better extraction of coffee, i.e., a higher "extraction yield", more aroma and a better "crema", more convenience in operation and they ensure freshness of the substance contained therein. As a result, the delivery of freshly extracted beverages of constant quality is better ensured.

For instance, the actual system commercialized under the trademark "Nespresso®" is appreciated for producing good quality short cups of coffee and long cups of coffee. A short cup of coffee extract is defined as containing less than 50 grams of coffee liquid extract in the cup and more specifically about 40 g for the espresso type and about 25 g for the ristretto type. Due to the high pressure extraction conditions maintained in the capsule, in the order of 10-20 bar the liquid extract which is delivered can be given desirable quality attributes in term of coffee yield, coffee solids and "crema" and within a delivery flow time which is found acceptable for the user. Therefore, typically a short coffee extract can be delivered within a flow time of between 20 and 45 seconds in order to provide a desired body, taste, flavour and crema.

There is a need to deliver a short coffee extract in a reduced flow time however maintaining the quality attributed relatively unchanged.

There is also a need to deliver a short coffee extract with a stronger taste.

The present invention aims at a significant improvement to the capsule system of the prior art. In particular, a main object is to reduce flow time when delivering a short coffee extract from the capsule while at the same time maintaining or even improving the quality attributes of the coffee, in particular, a desirable strength (e.g. expressed by its "extraction yield") and also a sufficient thickness and texture of crema.

SUMMARY OF THE INVENTION

The invention is thus based on the finding that the granulometry of the coffee bed with a control of the fines content in the coffee bed plays a key role in the reduction of the pressure loss in the coffee bed while maintaining the desired coffee extraction. The reduction of the fines content provides a reduction of the pressure loss in the coffee bed. The pressure loss being reduced, the coffee extract can be delivered at a higher flow rate.

The invention is thus based on the principle of reducing the level of fines in the coffee ground; such level of fines providing a faster flow while not significantly affecting the extraction yield of the resulting coffee.

Therefore, the invention relates to a method for delivering a short coffee extract faster or with a higher yield from a closed capsule containing ground coffee by injecting water under pressure within the capsule, wherein the capsule is filled with ground coffee and has a delivery membrane;

wherein the capsule is extracted in a coffee extraction device and pressurized water is injected in the capsule under pressure;

wherein the coffee beverage is released through the beverage delivery membrane of the capsule with engaging means engaging in and/or against the membrane;

wherein the pressure loss is reduced in the coffee bed by providing in the capsule ground coffee having a controlled percentage of fines (F) depending on the average particle size ($D_{4,3}$) within the following limits:

F is lower than 16% when $D_{4,3}$ is measured between 300 and 350 microns,

F is lower than 18% when $D_{4,3}$ is measured between 250 and 299 microns

F is lower than 21% when $D_{4,3}$ is measured between 200 and 249 microns,

F is lower than 28% when $D_{4,3}$ is measured between 150 and 199 microns, and wherein the extraction yield is maintained between 15 and 30%; and, wherein a coffee extract of 25 or 40 grams is delivered in a flow time of 20 seconds or less.

Preferably, the pressure loss in the coffee bed is reduced by providing in the capsule ground coffee having a percentage of fines (F) depending on the particle size within the following limits:

F is between 12 and 16% when $D_{4,3}$ is measured between 300 and 350 microns,

F is between 14 and 18% when $D_{4,3}$ is measured between 250 and 299 microns,

F is between 17 and 21% when $D_{4,3}$ is measured between 200 and 249 microns,

F is between 22 and 28% when $D_{4,3}$ is measured between 150 and 199 microns.

A control of the level of fines as determined as function of the size particle of the coffee grind enables to decrease the pressure loss in the coffee bed, consequently significantly reduces the flow time.

Preferably, a single grinding within the aforementioned specific ranges of $D_{4,3}$, is dosed and filled in the capsule to achieve the method of the invention.

For a short coffee extract, an attribute that is distinctive of the character or strength of the coffee in the cup relates to the extraction yield. It has been found that the extraction yield must preferably be maintained within a certain range. If the extraction yield is too high, the coffee is usually over-extracted and considered as bitter and harsh because non-desirable compounds have been extracted. Conversely, if the extraction yield is too low, the coffee tastes watery and is also not found acceptable for the average consumer. Therefore, surprisingly, the invention provides a method wherein while the flow time is significantly reduced, the extraction yield is further maintained or even increased through finer grinding within a range preferably comprised between 18 and 30%, most preferably between 19 and 25%.

The amount of ground coffee contained in the capsule remains reasonably low; preferably of from 4.5 to 6.5 grams, more preferably, of from 5 to 6 grams.

It has been surprisingly found that within a preferred average particle size of $D_{4,3}$ ranging of from 200 to 300 microns, the flow time for delivering 25 g or 40 g of coffee extract can be reduced significantly to 15 seconds or even less, even at approximately 10 seconds. The flow time is also surprisingly relatively constant within a $D_{4,3}$ range of 190-300 microns.

Despite a faster extraction, coffee flavour profile as well as body and aftertaste can be improved compared to the same average particle size with higher fines level. For instance, the extraction yield within an average particle size, $D_{4,3}$, between 200 and 300 microns, can be maintained or increased within 20 and 23%.

Crema is also sought in a short extract of coffee as a key quality attribute. The crema should be thick and stable. It should cover the whole surface of the beverage in the cup without leaving any black hole. Therefore, quality of crema is determined by a test consisting of layering crystal sugar and measuring the time before sugar sinks in the coffee extract. Surprisingly, also a short coffee extract delivered in a faster time has a crema of excellent characteristics. For example, a coffee extract delivered in reduced time of about 10 seconds, at an average particle size of $D_{4,3}$ of from 200 to 300 microns, the crema exhibits a stability at the sugar test of more than 10 seconds, even more than 12 seconds, preferably between 12 and 15 seconds.

In addition, the pressure loss at the membrane/engaging means interface can be controlled to provide improved quality attributes.

Pressure loss at the membrane/engaging means interface can be controlled by having a membrane which has a higher puncture resistance of at least 1.1 mJ. Even preferably the membrane has a puncture resistance of between 1.1 mJ and 3.5 mJ. Most preferably, the membrane has a puncture resistance of between 1.35 and 3.2 mJ. The membrane can be made of different material such as aluminium, aluminium alloy and/or plastic.

In a preferred example, when the membrane is made of aluminium or aluminium alloy, the membrane has a thickness comprised between 26 and 40 microns, even more preferably of about 30 microns. The membrane is preferably torn under the effect of the extraction pressure in contact with the engaging means. The engaging means may comprise a plurality of reliefs or alternatively a single one. The capsule may contain an internal filter if necessary to retain the coffee ground inside the capsule after opening of the membrane. The water pressure at the injection side of the capsule can reach a value that exceeds 11 bar, even higher than 14 bar.

In order to obtain a reduction of the fines in the capsules, one possible method may consist in grinding the coffee beans (before filling the capsules) by using a grinder, which comprises at least one pair of rolls having radial corrugations in the fine grinding section as opposed to longitudinal corrugations. Good results have been obtained by grinding coffee using at least 3 stages, preferably 4 stages with at least one roll being radially corrugated. The best results have been obtained by at least 4 stages using only grinding rolls with radial corrugations, in particular 6 stages.

The coffee in the capsule can be filled in a loose state in the capsule, i.e., without compacting step before or after filling it in the capsule. Alternatively, the coffee can be densified before the filling step using a densifying device. However, the coffee is not compacted in a solid block in the capsule but remains in a flowing state in the capsule.

In a preferred example, the opening plate for the delivery membrane is formed of a network of protruding reliefs, preferably, a number comprised between 20 and 50; each relief having a flat upper surface of individual surface area comprised between about 0.5 and 5 mm$^2$. More preferably, the upper surface of each individual surface area of the relief is comprised between 0.8 and 3 mm$^2$. Such an opening arrangement may also participate to generate a pressure loss that is sufficient to form a better crema.

DETAILED DESCRIPTION OF THE PREFERRED EMBODIMENTS

In the present application, terms are utilized for which the definitions are given as a preamble below.

The "extraction yield" refers to the strength of the extract and is defined as the weight of total solids in the liquid extract divided by the total weight of starting coffee ingredients in the capsule (e.g., roast and ground coffee). This value is typically expressed as a percentage.

The "total solids" is defined as the weight of extracted solids contained in the extract divided by the total weight of the extract. This value is typically expressed as a percentage.

The "injection pressure" is defined as the maximal pressure expressed in bar and measured at the injection point(s) in the capsule during extraction.

The "flow time" is defined as the time from the first moment of fluid dropping into the coffee cup to the moment the extracts has been delivered into the cup with the desired weight, strength and character.

"Short coffee extract" is defined as the liquid extract as obtained from the capsule with a weight of about 25 g (+/−2) for "ristretto" and 40 g (+/−2) for "espresso".

The average particle size "$D_{4,3}$" represents the mean volumetric diameter of the coffee grind as obtained by laser diffraction method using a Malvern® optical instrument and butanol as dispersing agent for the particles.

The "fines" are considered as being coffee particles having a diameter of less than 88.91 microns when measured by the Malvern® laser diffraction method.

A "stage" for grinding coffee in a grinder represents a pair of rolls.

The "delivery membrane" is meant to be the wall of the capsule from which the coffee is delivered comprising at least one beverage outlet provided after opening by any suitable method including cutting, puncturing and/or tearing or eventually pre-formed outlet (e.g., a filter).

The "puncture resistance", expressed in milli-Joules, is defined as the energy needed to puncture the membrane of the capsule by using a MTS Synergie 400 tensile equipment supplied by Fuch Industrievertretungen (Switzerland) as further described in EP 1566127 A2; the content of which is included here by reference.

The "granulometry" of the ground coffee is defined as the average particle size of the coffee particles and fines level as resulting after grinding as explained in the examples.

The "crema" is defined as the head of foam created on the coffee extract with a texture of substantially small bubbles. The crema attribute can be measured by an empirical sugar test as defined in example 9, which consists in arranging a well defined crystal sugar layer on top of a freshly prepared cup of coffee and measuring the elapsing time between the start of overlaying and the main part of sugar's sinking. The "sugar test value" is thus a number of seconds.

The "engaging means" represents an element of the extraction device or capsule having the function of engaging in or pressing against the membrane to provide a certain pressure loss that enables to delay the release of coffee out of the capsule. The engaging means can take various forms able to provide in conjunction with the membrane a certain pressure loss such as a central needle or multiple needles or a plate with multiple protrusions and/or bumps, or a filter plate or other physical obstacles.

The present invention relates to a system that uses closed capsules and their attached benefits, as aforementioned, to provide coffee beverages of short volume.

Figure 8:
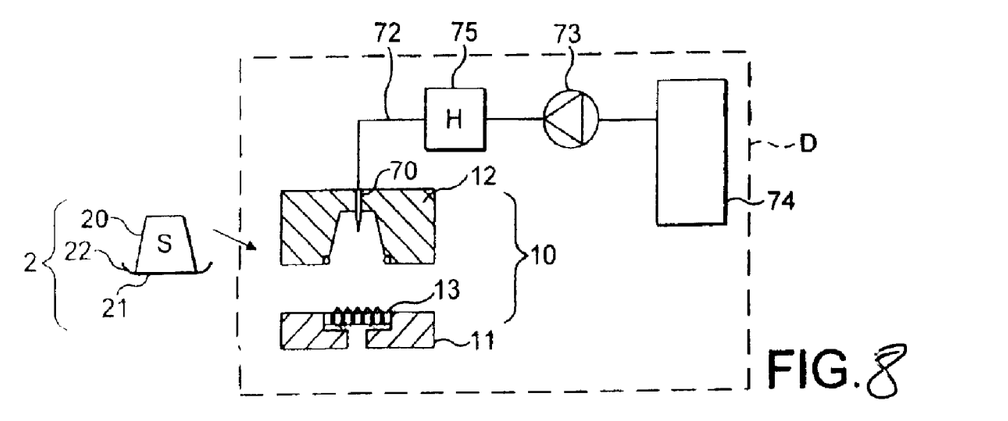
FIG. 8 shows a schematic representation of the system of the invention before insertion of the capsule.
Figure 9:
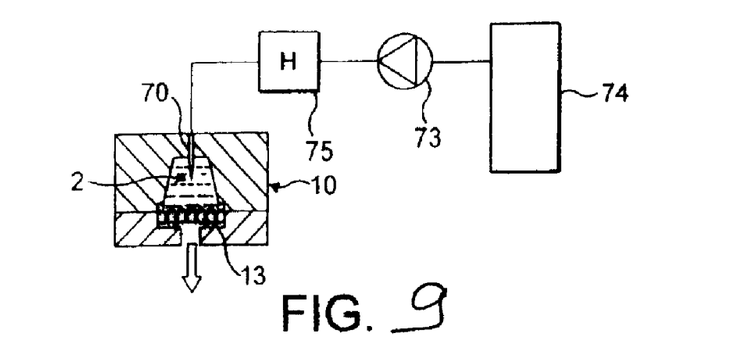
FIG. 9 shows a schematic representation of the system; the device being closed and a cartridge being extracted in the device.

FIGS. 8 and 9 schematically illustrate an exemplary system of the invention. The device D of the invention comprises an extraction module 10 for extracting coffee from one capsule at a time. The extraction module comprises receiving means in the form of a support base or collector 11 and an injection part 12. The support base and injection part defines an internal volume upon closing of the two parts to receive the capsule. In the support base is located engaging means 13 arranged to engage with a retaining part of the capsule when pressure of fluid is built inside the capsule. The engaging means 13 may be piercing means such as a series of protruding elements such as pyramids, a network of elongated ribs or needles which are provided on the surface of a plate. The coffee extract is primarily filtered by the very narrow spacing produced between the protruding elements and the edges of the openings of the membrane. The plate comprises a series of apertures to drain the extract and eventually retain any solid coffee particles. The apertures may be provided through the plates in channels formed between the protruding elements or alternatively, be provided through the protruding elements themselves.

The device further comprises at least one fluid line 72 to which the fluid can be supplied in the capsule via at least one injector 70. The injector may comprise one or more needles or blades which create one or more passages for water to enter in the capsule. The fluid is supplied under pressure in the line by means of a pump 73. The pump may be an electromagnetic piston pump or any suitable water pumping mechanism such as a diaphragm pump or pressurized head systems. A reservoir of fluid 74 can be installed upstream the pump 73 to enable fluid to be supplied in sufficient amount for delivering fluid to extract more than a capsule. Preferably, the reservoir holds more than 750 ml of water so as to eliminate the inconvenience of repeatedly refilling the reservoir after a few extraction cycles. A heating system 75 can be installed along the line between the reservoir and the extraction module 10 to heat the fluid at a required temperature. The heater is configured to heat the water to a temperature of extraction of between 70 to 100° C. It can be a thermoblock or an instant heating device such as ceramic heating cartridges. The reservoir could also be such as a boiler that can keep the fluid warm or hot. A control board with switches is also usually helpful to automatically start the extraction cycle. Different controls can be added such as temperature sensors, timers, flow meters, pressure sensors, vanes, probes and so on for controlling and monitoring the extraction operations. The device could also encompass many other variants.

The coffee capsule S has a body 20 and a membrane 21 made of a material such as aluminium and/or plastic. The capsule can take many different shapes without departing from the scope of the invention. The membrane could also be formed as the bottom of the body itself. The membrane can take a predefined shape before (e.g. convex or concave) and deforms against the engaging means 13 during extraction.

According to one important aspect of the invention, the capsule is filled with ground coffee of controlled particle size and reduced amount of fines.

The capsule may be flushed at a slight overpressure with an inert gas to increase the shelf life of the coffee inside. The membrane can take a slight convex shape as a result of the internal pressure of gas. Inert gas is typically nitrogen but other inert gas could be used. Carbon dioxide gas from the coffee also participates to the inside building of pressure as a result of ground coffee de-gassing inside the capsule after filling and sealing of the capsule. Therefore, the membrane should be sufficiently resistant to withstand the internal pressure of gas including the gas from de-gassing inside the capsule.

When the extraction module 10 is closed around the capsule 2 and the capsule is positioned in the module, as shown in FIG. 9, the retaining member, i.e., hereafter called "membrane", is positioned adjacent or at a short distance from the engaging means 13 of the device. The membrane of the capsule is not opened until a certain opening pressure is built within the capsule by virtue of water coming in the capsule. The membrane and engaging means are so arranged to not create an accidental opening before extraction begins. Therefore, as water is entering within the capsule pumped by the pump means 75, the internal pressure builds up inside the capsule which makes the membrane 21 to deform and press on the engaging means 13 up to a point where it becomes pierced or torn open. The capsule starts opening at a certain opening pressure but pressure usually continues increasing due to the compaction of the bed of ground coffee inside the capsule and also due to the pressure drop created by the narrow openings torn or pierced through the membrane of the capsule. Then, the pressure level usually flattens to a pressure of extraction, which is typically of several bars above the opening pressure and then drops when the pump is shut off. The overall pressure loss is usually the addition of the pressure loss created by the compacted coffee bed and the pressure loss created by the conjunction of the small openings through the membrane and the engaging plate 13 of the device. It can be noted that the engaging plate could be a part of the capsule itself. It can be noted that the membrane of the capsule can be pre-opened before water injection such as by one or more needles of the engaging plates.

The pump has a fixed performance characteristic curve which means that it delivers a certain flow rate of water when downstream the pump has to overcome a certain pressure depending on the characteristics of the capsule (granulometry, membrane, etc.).

The invention is based on the principle that the pressure loss in the coffee bed has been significantly reduced as compared to the pressure loss of the coffee bed in the capsules of the existing systems while at the same time substantially maintaining the extraction characteristics (i.e., the extraction yield).

For that, the granulometry of the coffee ground in the capsule has been modified with reduced level of fines. Preferably, the percentage of fines (F) is related to the measured range of particle size ($D_{4,3}$). When the particle size increases, the amount of fines usually inversely decreases. The finer the coffee is ground, the more fines are created. According to one preferred aspect of the invention, the percentage of fines F is determined as a function of $D_{4,3}$ within the following preferred limits:

F is between 12 and 16% when $D_{4,3}$ is measured between 300 and 350 microns,
F is between 14 and 18% when $D_{4,3}$ is measured between 250 and 299 microns,
F is between 17 and 21% when $D_{4,3}$ is measured between 200 and 249 microns,
F is between 22 and 28% when $D_{4,3}$ is measured between 160 and 199 microns.

Preferably, the capsule is filled with one single selected grinding having a selected particle size $D_{4,3}$. In other words, two or more grindings having different particle sizes ($D_{4,3}$) are not mixed for filling a capsule.

The granulometry with a reduced amount of fines, as defined above, enables to control the flow time for short coffee extracts. In particular, a flow time of less than 20 seconds, preferably 15 seconds or less, can be successfully obtained for delivering 25 or 40 grams of a coffee extract with an extraction yield comprised between 15 and 30%, preferably between 18 and 30%.

The following examples further illustrate the invention in a non-limiting manner.

EXAMPLES

In the following test results presented in Examples 1 to 4 below, Nespresso® coffee capsules of standard volume and shape were filled loose with 5.0 grams of ground coffee. The capsules made of aluminium were sealed with an aluminium beverage delivery membrane of 30 microns. The coffee characteristics were compared in view of the extraction yield and crema quality ("sugar test").

Example 1

Grinding Technology

Figure 1:
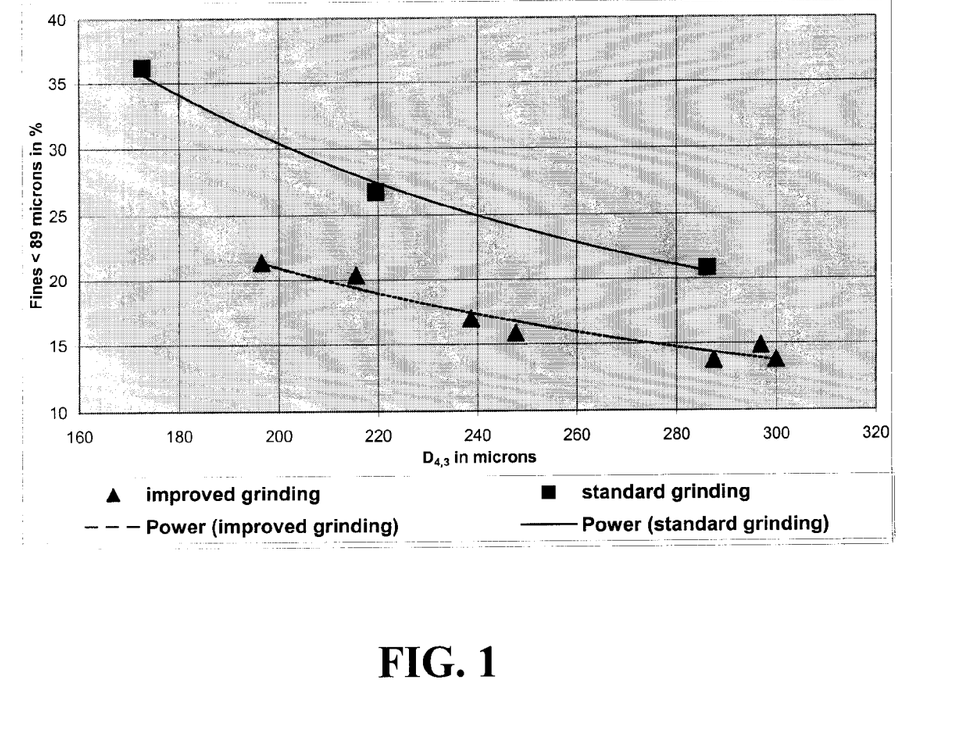
FIG. 1 is a graphic showing the relation between the average particle size of ground coffee and fines levels for standard grinding and improved grinding of the invention.

The graphic of FIG. 1 illustrates the relation between the average diameter $D_{4,3}$ and the percentage of fines considering different grinding technologies.

The curve "Standard grinding" was obtained by grinding coffee beans, at different average particle sizes, using a standard grinding technology utilizing only axial corrugated rolls.

The curve "Improved grinding" was obtained by grinding coffee beans at different average particle sizes, using a grinding technology utilizing six stages including 10 corrugated rolls on the five first stages and two smooth rolls on the last stage. The grinding technique has led to obtain a reduced amount of fines as compared to the standard grinding.

As shown by the lower curve for the improved grinding, the level of fines can be lowered to a value of about 21% at an average particle size of 199 microns, about 19% for an average particle size of about 240 microns and about 15% for an average particle size of 299 microns.

Example 2

Impact of Granulometry (Average Particle Size/Fines) on Flow Time

Figure 2:
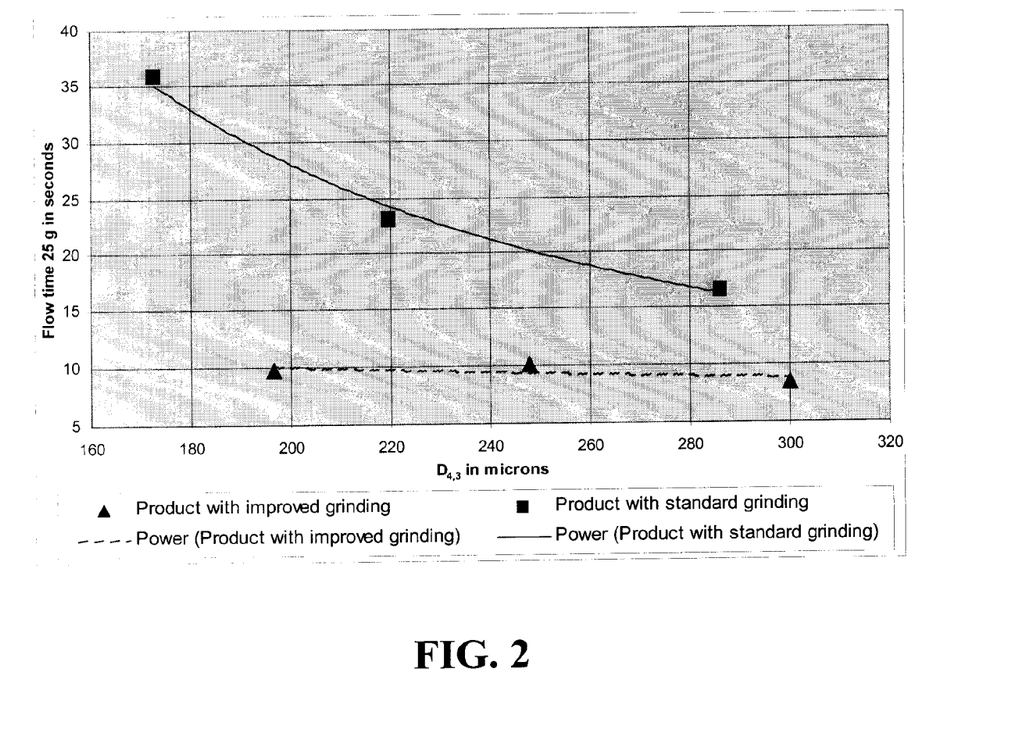
FIG. 2 is a graphic showing the relation between the granulometry and the flow time for delivering 25 g of coffee extract.

The graphic of FIG. 2 shows the impact of the average particle size ($D_{4,3}$) on flow time through the capsule for blends having reduced particle sizes obtained by the improved grinding and standard blends obtained by a standard grinding. Surprisingly, in the range from 200 to 300 microns, the flow time is approximately constant (about 10 seconds) with a ground coffee having fewer fines as opposed to the standard coffee blend having the usual fines content. In general, the flow time of the coffee extract can be significantly reduced with coffee blends having reduced levels of fines.

Example 3

Impact of Flow Time on Extraction Yield

Figure 3:
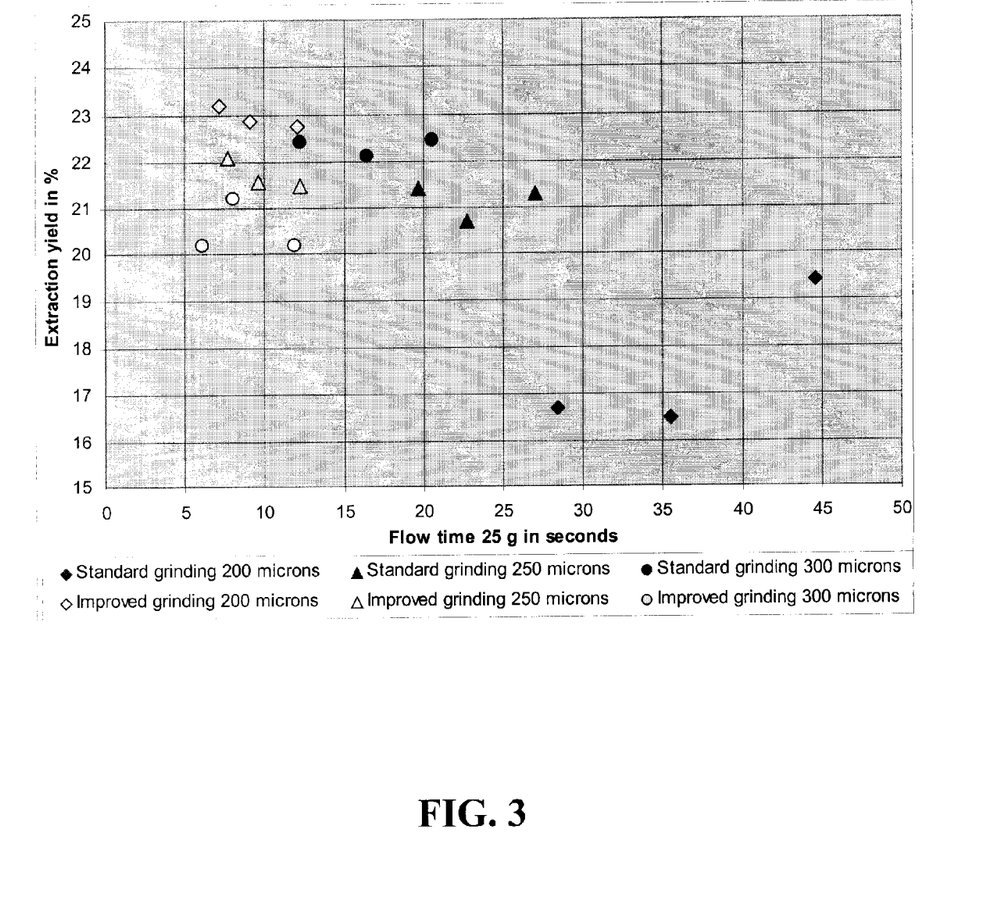
FIG. 3 is a graphic showing the relation between the flow time for delivering 25 g of coffee extract and the extraction yield for standard blends and blends of the invention.

The graphic of FIG. 3 shows the impact of the flow time for delivering 25 g of coffee extract on the extraction yield using, respectively, capsules of the invention containing ground coffee with reduced fines content ("Improved") for three different average particle sizes, respectively, 200, 250 and 300 microns. The capsules of the invention were compared to capsules containing ground coffee with normal fines content ("Standard") for same average particle sizes. The extraction yield of the resulting coffee extracts was calculated according to the procedure explained in Example 9. Surprisingly, the results show that the improved blends with a reduced fines level provide a significantly lower flow time compared to the standard blends while at the same time the extraction yield remains within the desired range. All blends of the invention within the range of 200 to 300 microns experienced a flow time for delivering 25 g of coffee extract which is significantly lower than 15 seconds. It is also surprising to notice that the highest yield (about 23%) is achieved with the finer grind for the improved grind. This is the opposite with the standard blends, where the lowest yield (about 16.5%) is achieved with the finer grind. The finer the average particle size, the slower the flow with the standard blends. With the standard blends, the flow resistance through coffee bed is presumably too high to assure a thorough extraction of the whole amount of coffee ("channel effect") in particular at a particle size of 200 microns.

Example 4

Impact of Flow Time on Crema

Figure 4:
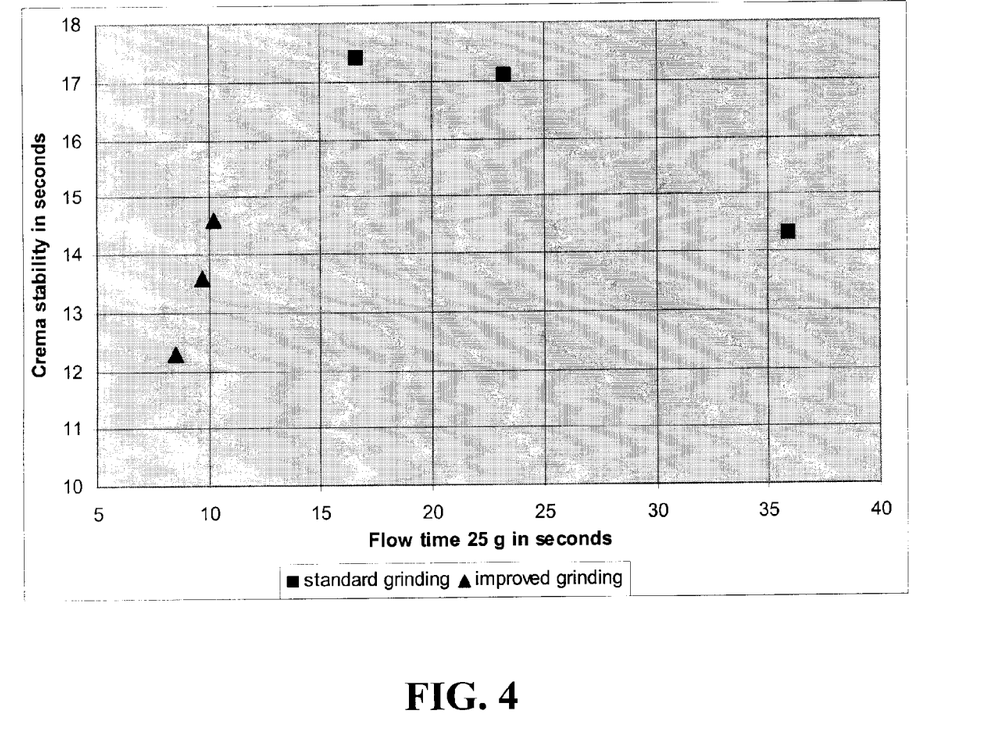
FIG. 4 is a graphic showing the relation between the flow time for delivering 25 g of coffee extract and the quality of crema obtained as determined by the sugar test.

The chart of FIG. 4 represents the results obtained with blends having respectively reduced fines content ("Improved") and normal fines content ("Standard industrial product"). The capsules were filled with 5.0 grams of ground coffee. The blends were ground at, respectively, 200, 250 and 300 microns. The capsules were extracted for delivering 25 g of coffee extract. The results show that the crema remains relatively stable, at least above 12 seconds, more particularly, between 12 and 15 seconds, for the improved blends with reduced fines content. The flow time could be reduced to less than 15 seconds with the improved grinding.

Example 5

Impact of Average Particle Size on Flow Time with Average Particle Size Between 200 and 240 Microns

Figure 5:
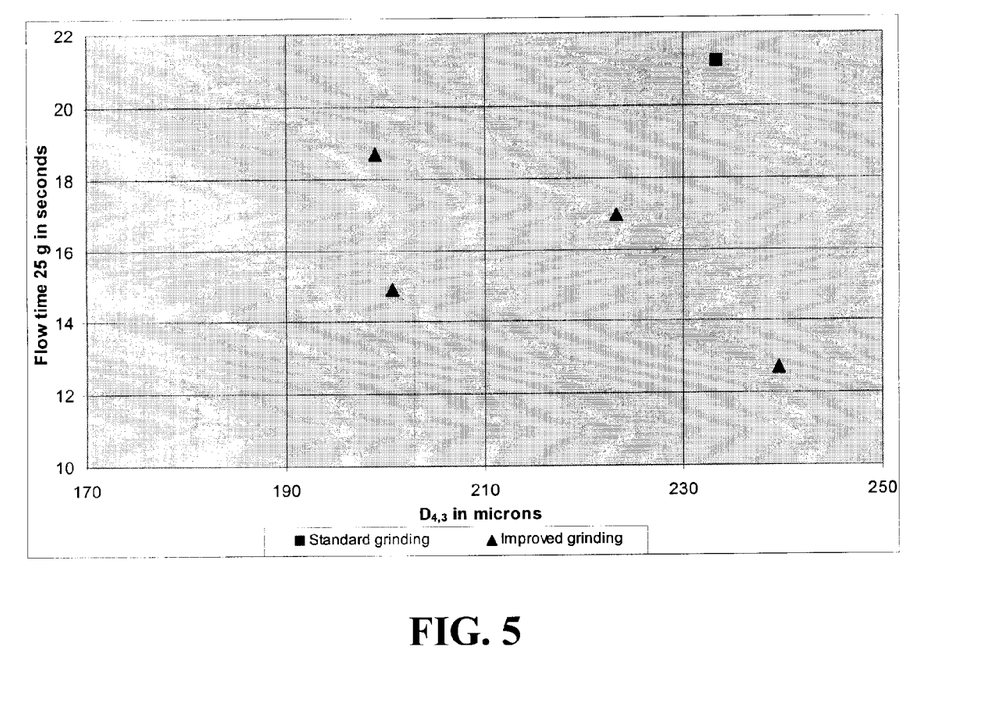
FIG. 5 is another graphic showing the relation between the average particle size of ground coffee between 190 and 250 microns and the flow time for delivering a short coffee extract.

The chart of FIG. 5 show additional results within an average particle size of between 200 and 240 microns. Improved grindings with lower levels of fines are compared to an industrial "Roma" coffee grinding of about 230-micron average particle size. The samples ground with a radially corrugated grinder have approximately the same or finer particle sizes. The samples were densified using a normalizer as described in EP 1 566 127 A2. The capsules were filled with 5 grams of ground coffee. Flow time can be reduced to less than 20 seconds with the improved grinding.

Example 6

Impact of Flow Time on Extraction Yield with Average Particle Size Between 200 and 240 Microns

Figure 6:
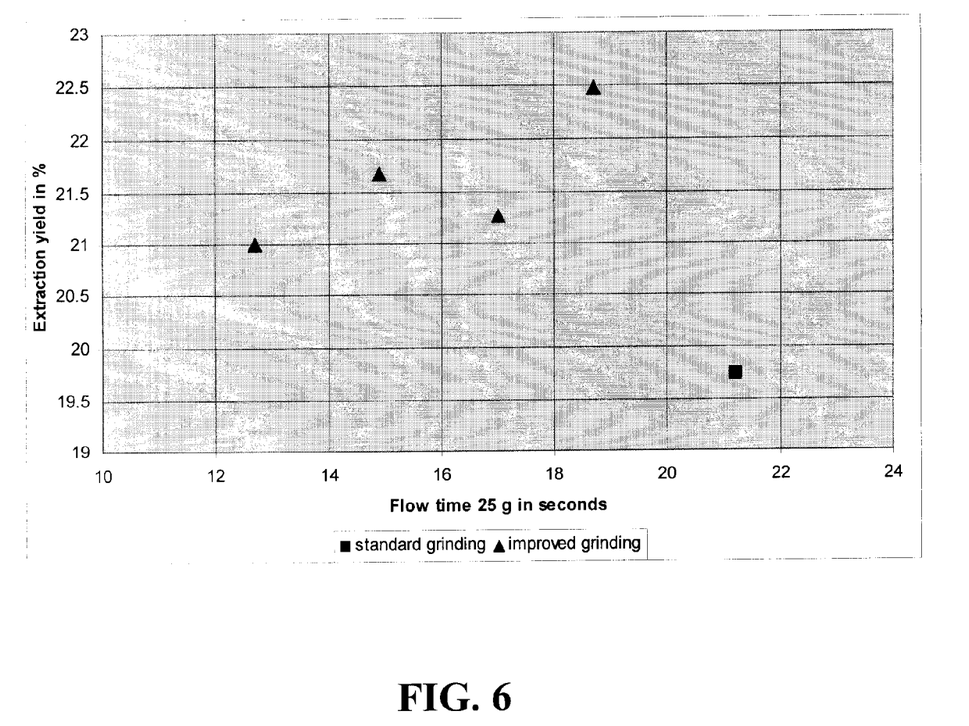
FIG. 6 is another graphic showing the relation between the flow time for delivering 25-g coffee extract and the flow time for grinding between 245 and 275 microns.
Figure 7:
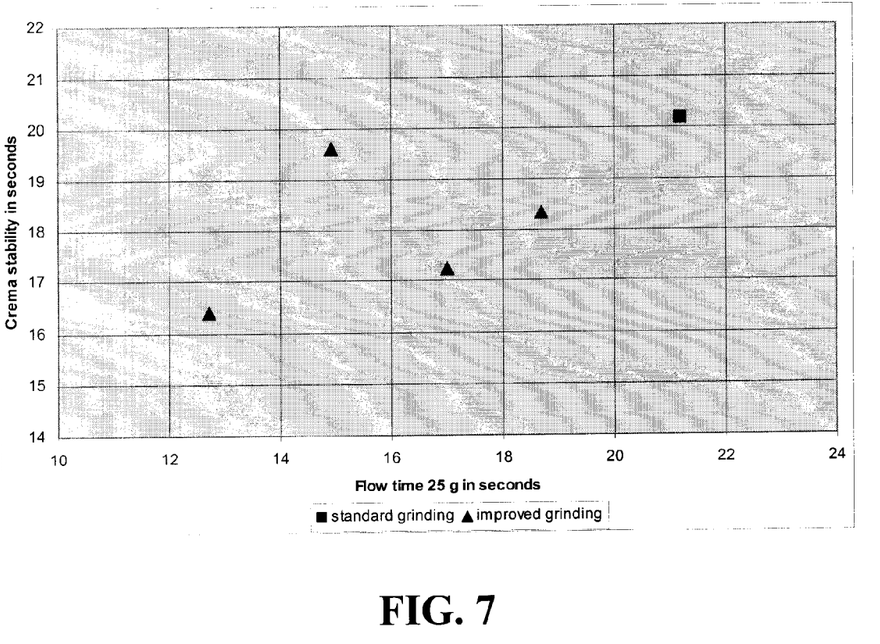
FIG. 7 is another graphic showing the relation between flow time and crema stability for grinding between 245 and 275 microns.

The chart of FIG. 6 shows additional results within an average particle size of between 200 and 240 microns. The extraction yield of the improved grinding is higher than the standard especially for finer grinding. For a flow time of between about 12 to 20 seconds, the extraction yield can be increased to values comprised between about 20.5 to 22.5%.

Example 7

Additional Results

Additional results are presented in the following tables 1:

TABLE 1

| | | Physical properties of blends | | Flow properties and coffee attributes | | | |
|---|---|---|---|---|---|---|---|
| | $D_{4,3}$ [μm] | Fines [%] | Coffee weight [g] | flow time (mean) [s] | stdev [s] | foam [s] | % Yield (mean) % |
| Standard Blends | 200 | 36.2 | 5.0 | 36 | 7 | 14 | 17.5 |
| | 250 | 26.7 | 5.0 | 23 | 3 | 17 | 21.1 |
| | 300 | 20.9 | 4.8 | 17 | 4 | 17 | 22.3 |
| Improved Blends | 200 | 21.4 | 5.0 | 10 | 3 | 14 | 22.9 |
| | 250 | 15.8 | 5.0 | 10.2 | 3 | 15 | 21.7 |
| | 300 | 13.8 | 5.0 | 8.5 | 2 | 12 | 20.5 |

Additional results are also represented in the following table 2 for various coffee blends within an average particle size ranging of from about 160 microns to about 375 microns.

TABLE 2

| | Membrane [μm] | Coffee weight [g] | Product/Blend | sugar test (s) | $D_{4,3}$ [μm] | fines <89 in % | Flow [sec] | Yield % |
|---|---|---|---|---|---|---|---|---|
| Standard | 30 | 5.0 | Blend A 40 g | 16 | 372.86 | 17.77 | 16 | 23.3 |
| | 30 | 5.0 | Decaffeinated 40 g | 16 | 245.09 | 21.32 | 19 | 20.5 |
| | 30 | 5.5 | Decaffeinated Intense 40 g | 13 | 283.94 | 22.45 | 13 | 20.7 |
| | 30 | 5.5 | Blend B 40 g | 16 | 240.16 | 24.46 | 15 | 26.9 |
| Improved | 30 | 5.0 | Decaffeinated 40 g | 15.3 | 249.29 | 16.41 | 12.5 | 20.2 |
| | 30 | 5.0 | Decaffeinated 40 g | 16.7 | 258.25 | 16.24 | 14.6 | 20.7 |
| | 30 | 5.0 | Decaffeinated 40 g | 15 | 194.5 | 21.39 | 13.3 | 21.5 |
| | 30 | 5.0 | Decaffeinated 40 g | 14.8 | 186.29 | 21.6 | 13.9 | 21.5 |
| | 30 | 5.5 | Decaffeinated Intense 40 g | 15.2 | 282.32 | 15.15 | 12.2 | 20.3 |
| | 30 | 5.5 | Decaffeinated Intense 40 g | 14.5 | 271.23 | 14.75 | 13 | 20.5 |
| | 30 | 5.5 | Decaffeinated Intense 40 g | 15.5 | 215.54 | 19.82 | 11.8 | 21.7 |
| | 30 | 5.5 | Decaffeinated Intense 40 g | 13.3 | 211.71 | 18.75 | 12.8 | 21.8 |
| | 30 | 5.0 | Blend A 40 g | 16.5 | 337.27 | 12.75 | 13.2 | 22.3 |
| | 30 | 5.0 | Blend A 40 g | 13.9 | 340.35 | 12.46 | 14.7 | 22.8 |
| | 30 | 5.0 | Blend A 40 g | 19.3 | 308.08 | 14.06 | 12 | 22.9 |
| | 30 | 5.0 | Blend A 40 g | 9.6 | 317.29 | 12.56 | 14.5 | 23.4 |
| | 30 | 5.5 | Blend B 25 g | 14.9 | 161.98 | 28.21 | 17.5 | 26.6 |
| | 30 | 5.5 | Blend B 25 g | 14.9 | 161.98 | 28.21 | 17.5 | 26.7 |

Example 8

Granulometry

The particle size distribution was determined by laser diffraction using a "Mastersizer S" instrument from Malvern® equipped with a 1000 mm optical lens. 1-2 g of powder are dispersed in 1 liter of butanol and recirculated in front of the laser beam in order to obtain an obscuration between 15 and 20%. The particle size distribution is obtained by Fraunhofer approximation of the diffraction pattern. The complete experiment is repeated 3 times (or until the StDev <5%) and the results are averaged.

Example 9

Sugar Test for Crema Measurements

The mechanised sugar test device is composed of a small sugar-containing silo. The prismatic V-shape of this silo comprising a defined slit (2 mm×40 mm) at the bottom edge can create a uniform sugar curtain as long as the slit is free and a minimum of sugar remains in the silo. This silo can be moved horizontally, with controlled speed (~40 mm/s) from one point "A" to a point "B" (distance between A and B is 20 cm). In the end position at both points a baffle prevents the sugar from flowing out if the device is in stand-by mode. When the silo is moved, the sugar curtain is produced all the way between the two points "A" and "B". The crema in a cup that is placed at 60 mm below this path within the two points will be topped with a uniform layer of sugar when the silo passes over it. The chronograph is started when the sugar layer is positioned on the foam's layer. The amount of sugar (a thickness of the layer to obtain a precise weight of 5 g of sugar) deposed in the cup is adjustable by varying the speed of the silo or the dimensions of the slit. The sugar is crystal sugar of $D_{4,3}$ equal to 660 microns.

A precise waiting period (20 sec. for small cups) must be observed between the end of extraction and the start of the sugar test.

The sugar layer remains some time on top of the crema. Later, when the main part of the sugar sinks suddenly the observing operator must stop the chronograph.

The "sugar test value" is the number of seconds shown by the chronograph.

Example 10

Extraction Yield

The extraction yield is calculated by the relation:

$$\text{Yield}(\%) = M_e Tc / M_s$$

where $M_e$ represents the weight of the coffee extract, and $M_s$ represents the weight of the ground coffee contained in the capsule and Tc represents the percentage of total coffee solids in the coffee extract obtained after oven drying of the coffee extract.

The invention claimed is:

1. A method for delivering a coffee extract of 25 to 40 grams from a capsule containing ground coffee within a flow time of 20 seconds or less by injection of water under pressure within the capsule, which comprises:
   providing a ground coffee containing capsule for extraction in a coffee extraction device where water is injected into the capsule under pressure to deliver the coffee extract, the capsule having a delivery membrane and filled with a bed of ground coffee; wherein the delivery membrane initially retains the ground coffee therein until the coffee beverage is released through the delivery membrane of the capsule with engaging means engaging in or against the membrane to provide an exit for the coffee beverage; and
   reducing pressure loss at the interface of the membrane and engaging means by providing a membrane having a puncture resistance of between 1.1 and 3.5 mJ, and by providing in the capsule ground coffee having an average particle size of less than 300 microns, and a controlled percentage of fines (F) depending on the average particle size (D4,3) within the following limits:
   F is between 14 and 18% when D4,3 is between 250 and 299 microns,
   F is between 17 and 21% when D4,3 is measured between 200 and 249 microns, and
   F is between 22 and 28% when D4,3 is measured between 150 and 199 microns.

2. The method according to claim 1, wherein the capsule provides an extraction yield (Y) that is maintained between 18 and 30%.

3. The method according to claim 2, wherein the extraction yield (Y) is between 19 and 25%.

4. The method according to claim 2, wherein the capsule is filled with a coffee mass of from about 4.5 to 6 grams.

5. The method according to claim 2, wherein the capsule is filled with a coffee mass of about 5 grams.

6. The method according to claim 2, wherein the flow time is reduced to less than about 15 seconds.

7. The method according to claim 6, wherein the coffee extract has a crema which is stable at a sugar test for at least 10 to 15 seconds.

8. The method according to claim 1, wherein the pressure loss at the interface of the membrane and engaging means is increased by selecting a membrane made of aluminum having a thickness of between 26 and 40 microns.

9. The method according to claim 8, wherein the level of fines is controlled by having coffee beans ground before the filling in the capsule, wherein the beans are ground using a grinder comprising a fine grinding section that includes at least one pair of radially corrugated rolls.

10. The method according to claim 1, wherein the water pressure injected into the capsule reaches a value higher than 11 bar during extraction.

11. The method according to claim 1, wherein the ground coffee is not compacted in the capsule after filling.

12. The method according to claim 11, wherein the ground coffee is densified before filling or is filled loose.

13. The method according to claim 1, wherein the membrane is torn against engaging means by effect of the pressure of extraction for release of the coffee extract out of the capsule.

14. The method according to claim 1, wherein the engaging means comprises a plurality of reliefs.

15. A method for delivering a coffee extract of 25 to 40 grams from a capsule containing ground coffee within a flow time of 20 seconds or less by injection of water under pressure within the capsule, which method comprises:
   providing a ground coffee containing capsule for extraction in a coffee extraction device where water is injected into the capsule under pressure to deliver the coffee extract;
   providing the capsule with a delivery membrane having a puncture resistance of between 1.1 and 3.5 mJ;
   providing coffee ground using a grinder comprising a fine grinding section that includes at least one pair of radially corrugated rolls to provide ground coffee having an average particle size of less than 300 microns, and a controlled percentage of fines (F) depending on the average particle size (D4,3) within the following limits:
F is between 14 and 18% when D4,3 is between 250 and 299 microns,
F is between 17 and 21% when D4,3 is measured between 200 and 249 microns, and
F is between 22 and 28% when D4,3 is measured between 150 and 199 microns;
filling the capsule with a bed of the ground coffee wherein the delivery membrane initially retains the ground coffee in the capsule; and
delivering a coffee beverage after the water pressure injected into the capsule reaches a value higher than 11 bar by releasing the coffee beverage through the delivery membrane of the capsule with engaging means engaging in or against the membrane to provide an exit for the coffee beverage, thus delivering a coffee beverage having an extraction yield of between 18 and 30%.

16. The method according to claim 2, wherein the extraction yield (Y) is between 19 and 25%.

17. The method according to claim 2, wherein the capsule is filled with a coffee mass of from about 4.5 to 6 grams.

18. The method according to claim 15, wherein the pressure loss at the interface of the membrane and engaging means is increased by selecting a membrane made of aluminum having a thickness of between 26 and 40 microns.

19. The method according to claim 15, wherein the flow time is reduced to less than about 15 seconds.

20. The method according to claim 15, wherein the coffee extract has a crema which is stable at a sugar test for at least 10 to 15 seconds.

* * * * *

UNITED STATES PATENT AND TRADEMARK OFFICE
CERTIFICATE OF CORRECTION

PATENT NO. : 8,231,918 B2
APPLICATION NO. : 12/374825
DATED : July 31, 2012
INVENTOR(S) : Ohresser et al.

Page 1 of 1

It is certified that error appears in the above-identified patent and that said Letters Patent is hereby corrected as shown below:

In the Claims

Column 14:
Line 4, after "claim", delete "2" and insert -- 15 --.
Line 6, after "claim", delete "2" and insert -- 15 --.

Signed and Sealed this
Sixth Day of January, 2015

Michelle K. Lee
*Deputy Director of the United States Patent and Trademark Office*